United States Patent [19]

Keilberth et al.

[11] Patent Number: 5,129,572
[45] Date of Patent: Jul. 14, 1992

[54] PROCESS FOR THE MANUFACTURE OF A METALLIC COMPOSITE WIRE

[75] Inventors: Richard Keilberth, Weilbach; David F. Lupton, Gelnhausen, both of Fed. Rep. of Germany

[73] Assignee: W. C. Heraeus GmbH, Hanau, Fed. Rep. of Germany

[21] Appl. No.: 664,910

[22] Filed: Mar. 5, 1991

[30] Foreign Application Priority Data

Mar. 23, 1990 [DE] Fed. Rep. of Germany ....... 4009366

[51] Int. Cl.⁵ .................... B21D 39/04; B23K 31/02
[52] U.S. Cl. ............................ 228/131; 228/156; 228/158; 29/517; 428/607; 428/670
[58] Field of Search ............... 228/156, 158, 131; 428/607, 670; 72/700; 29/517

[56] References Cited

U.S. PATENT DOCUMENTS

| | | | |
|---|---|---|---|
| 2,215,477 | 9/1940 | Pipkin | 29/517 |
| 2,947,078 | 8/1960 | Pflumm et al. | 228/127 |
| 3,277,564 | 10/1966 | Webber et al. | 72/700 |

FOREIGN PATENT DOCUMENTS

| | | | |
|---|---|---|---|
| 21230 | 8/1882 | Fed. Rep. of Germany . | |
| 520035 | 3/1931 | Fed. Rep. of Germany . | |
| 1187804 | 2/1965 | Fed. Rep. of Germany | 428/670 |
| 1964457 | 9/1970 | Fed. Rep. of Germany | 228/156 |
| 3832342 | 7/1989 | Fed. Rep. of Germany . | |
| 1-321034 | 12/1989 | Japan | 228/156 |

OTHER PUBLICATIONS

Metals Handbook, Ninth Edition, vol. 14; 1988; pp. 849-851; ASM, Metals Park, Ohio.

*Primary Examiner*—Kurt Rowan
*Assistant Examiner*—Jeffrey T. Knapp
*Attorney, Agent, or Firm*—Felfe & Lynch

[57] ABSTRACT

A rod made of a hard material is inserted into a pipe made of a relatively soft material, and a two-element arrangement having an intermediate size is obtained by hot-rolling and drawing. In these steps, the cross section is reduced by at least 50%. Subsequently, another pipe of the soft material is fitted onto the two-element arrangement, and the so-obtained three-element arrangement is adjusted to its final size by means of hot or cold rolling followed by cold drawing.

5 Claims, No Drawings

PROCESS FOR THE MANUFACTURE OF A METALLIC COMPOSITE WIRE

BACKGROUND OF THE INVENTION

The invention relates to a process for the manufacture of a metallic composite wire having a core made of a hard material and a sheath made of a relatively soft material wherein a rod made of the core material is inserted into a pipe made of the sheath material. The cross section of this arrangement is reduced to a prescribed value by means of drawing.

A process of this kind is known from U.S. Pat. No. 3,848,319. It is employed for the manufacture of very thin wires made of a noble metal or a noble metal alloy. After the drawing, however, the sheath-material is chemically removed by etching. The core material is pure gold, and the sheath material is copper. In order to avoid diffusion between the gold and the copper or vice-versa, this known process does not employ heating steps.

U.S. Pat. No. 4,291,644 also discloses a process for the manufacture of a composite wire where a hard core material is provided with a soft sheath material by means of extrusion. The core is heated up by passing a current directly through it while it is kept under constant tensile stress, which can amount to 50% of the tensile strength of the core material. The core material is steel, for example, and the sheath material is aluminum.

SUMMARY OF THE INVENTION

It is an object of the present invention to provide an inexpensive process for the manufacture of quasi-endless lengths of metallic composite wire having a core of a hard first material which cannot be easily deformed, and a sheath of a softer second material while retaining a well rounded form of the wire and ensuring a uniform and centered core.

This object is achieved by producing a two-element composite from the rod-pipe arrangement in a first operating step by hot rolling, followed by drawing to an intermediate size. The initial cross section of the rod-pipe arrangement is reduced at least 50%. Then, a three-element composite is produced by fitting another pipe of sheath material onto the two-element composite, and then, the three-element composite is subject to hot or cold rolling and is subsequently drawn to its final size.

Wires produced in accordance with the invention have the advantage that interruptions, pores or cracks in the sheath are practically avoided by providing a second sheath, thus resulting in a high reliability and product quality. Composite wires having a sheath material of platinum and a core material of a platinum alloy which consists of 25 weight percent iridium, remainder platinum, and where the external diameter is 0.3 mm and the core diameter is 0.1 mm, can be manufactured up to a length of approximately 50 m. The one or several hot rolling steps of the process ensure a good adhesive connection between core and sheath material. Any separation between sheath and core, even if only partially, is thus positively avoided.

In the process of the invention, it has proven advantageous to draw the three-element composite to its final size in several cold drawing steps so that the cross section is reduced in several individual steps and not in one single step. The core will thus not rupture.

The process is particularly inexpensive when the second pipe is one that has the same dimensions as the one used for the manufacture of the two-element composite. The storage of the pipes is very simple since only one size of pipe is involved. The process is particularly suitable for those composite wires where the wall thickness of the sheath ranges between 15 and 40% of the diameter of the composite wire.

As already mentioned, the process of the invention is particularly suitable for the manufacture of composite wires having a sheath made of platinum and a core-material made of a platinum iridium alloy, in particular an alloy consisting of 25 weight percent iridium, the rest platinum. The segments of composite wire manufactured in accordance with the invention with a platinum sheath and a platinum iridium 25 core are, upon activation in a nuclear reactor, used as inserts for radiation treatment of cancerous tissue.

DETAILED DESCRIPTION OF THE PREFERRED EMBODIMENTS

The following is an example for the working of the process in accordance with the invention.

The initial material is a round rod made of platinum-/iridium-25 having an external diameter of 1.78 mm, and a platinum pipe with an external diameter of 3.1 mm and an internal diameter of 1.8 mm. The round rod and the pipe have a length of 250 mm each. The round rod serves as core material, and the pipe is the material for the sheath. The pipe is first slipped onto the rod and the rod-pipe arrangement, at room temperature, is then drawn to a diameter of 3.08 by means of a hard metal drawing die. Then, this arrangement is hot-rolled to 1.8 mm with the temperature being at 950° C. and the rolling profile corresponding an octagon. Subsequently, the hot-rolled intermediate product, while cold, is round drawn to a diameter of 1.78 mm. A platinum pipe of the same diameter as the initial pipe with a length, however, of 750 mm is now slipped onto this two-element arrangement. The so obtained three-element arrangement is cold-rolled to 1.00 mm and finally, by means of a diamond drawing die, in several steps cold-drawn to a diameter of 0.3 mm with the cross section being reduced by 12% per drawing step. The rod and the two pipes having the dimensions as indicated and a length of 250 mm yielded a composite wire of 0.3 mm in diameter and 70 m in length.

We claim:

1. Process for the manufacture of a metallic composite wire having a core made of a first material and a sheath made of a second material, said second material being softer than said first material, said process comprising the following step
   inserting a rod of said first material into a pipe of said second material to form a rod-pipe arrangement having an initial cross sectional area,
   hot rolling followed by drawing said arrangement to form a two element composite having a cross sectional area which is at least 50 percent less than said initial cross sectional area,
   inserting said two-element composite into a further pipe of said second material to form a three element composite,
   rolling said three element composite and, finally,
   cold drawing said three element composite to adjust the cross sectional area thereof to a final size wherein the wall thickness of the sheath ranges between 15% and 40% of the diameter of the composite wire.

2. Process in accordance with claim 1, wherein said three-element composite is drawn to its final size in several steps.

3. Process in accordance with claim 1, wherein said further pipe has the same cross section as the pipe used for the rod-pipe arrangement.

4. Process in accordance with claim 1 wherein the first material is a platinum iridium alloy and the second material is platinum.

5. Process in accordance with claim 4 wherein the first material is a platinum alloy containing 25 weight percent iridium.

* * * * *